Figure 1:
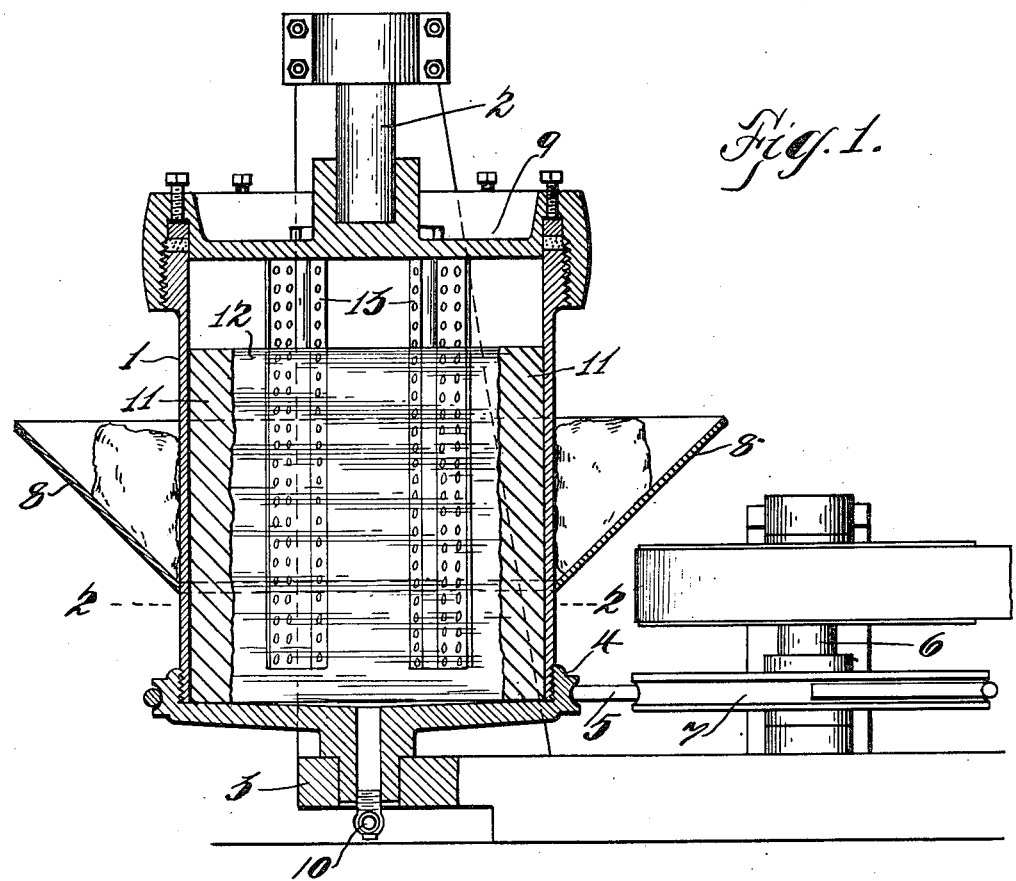

F. ECAUBERT.
METHOD OF SEPARATING SUBSTANCES.
APPLICATION FILED OCT. 8, 1906.

1,046,568.

Patented Dec. 10, 1912.

Witnesses:
E. A. Jarvis
Elizabeth Nicol

Inventor:
Frederic Ecaubert
By Axel V. Beeken
his Attorney

UNITED STATES PATENT OFFICE.

FREDERIC ECAUBERT, OF NEW YORK, N. Y.

METHOD OF SEPARATING SUBSTANCES.

1,046,568.  Specification of Letters Patent.  Patented Dec. 10, 1912.

Application filed October 8, 1906. Serial No. 337,846.

*To all whom it may concern:*

Be it known that I, FREDERIC ECAUBERT, a citizen of the United States of America, and a resident of borough of Brooklyn, city of New York, county of Kings, State of New York, have invented certain new and useful Improvements in Methods of Separating Substances, of which the following is a specification.

The present invention relates generally to a method of separating liquids or solids held in suspension by liquids, and has more particular reference to a method of recovering odors from a retaining agent.

The object of the present invention is to devise an improved method of separating substances whereby a complete and absolute separation can be effected.

In the prior art of separating substances it is customary to subject materials to centrifugal separation. This process as practised however, has always taken place in a vessel or bowl having radial outlets allowing the contents to escape radially as fast as it is separated. It is obvious that with this process it is not possible to obtain a complete or absolute separation inasmuch as the contents of the vessel will escape even though a partial separation only has taken place. Thus in separating cream from milk a portion of the cream will frequently escape with the milk. The separation, however, is complete enough for all practical purposes. In separating chemicals, however, and other materials where purity and consequently absolute separation is necessary, the process as heretofore practised allowing of radial escape cannot always be used to advantage.

In carrying out my process I employ a containing vessel closed to radial escape of its contents and by this means I am enabled to subject the contents of the vessel to a continued centrifugal separation. This will cause the component parts of the contents of the vessel to be separated into what might be termed an inner core and an outside ring. This process is especially useful where one of the component parts has a high freezing point inasmuch as the separation thus produced will then cause the said component part to solidify or coagulate. If the component part having the higher freezing point has the lower specific gravity it will form a solid core surrounded by a liquid ring. In substances where the component part having the higher freezing point also has the greater specific gravity, an outside ring formation of the solid material will be produced surrounding a liquid core. It is obvious that the materials so separated can be readily removed from the vessel, the liquid being simply drained off while the solid portions formed are broken up or otherwise removed from the vessel. If the component part having the higher freezing point will not solidify under the influence of the temperature of the air, the said solidification may be produced or facilitated, as the case may be, by subjecting the contents of the vessel, while separating, to the influence of a refrigerant.

In the accompanying drawings is shown a containing vessel by means of which my improved process can be carried out.

Figure 2:
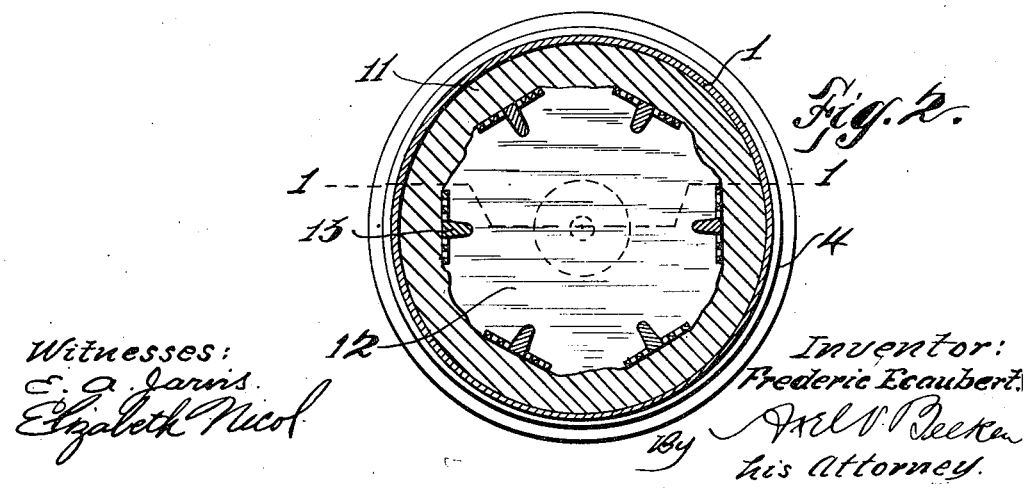

In the said drawings Figure 1 represents a vertical sectional view on the line 1—1 of Fig. 2 of a containing vessel used in connection with my improved process and Fig. 2 is a transverse horizontally sectional view on the line 2—2 of Fig. 1.

1 indicates a containing vessel closed to radial escape of its contents, as shown in the drawings, rotatably mounted in the bearings 2 and 3. A rotating motion may be imparted to this vessel by any suitable means but in the present instance the said vessel is provided with a pulley 4 which, by means of the belt 5 receives power from the counter shaft 6 carrying the pulley 7. 8 indicates troughs which may be employed for the purpose of holding ice against the vessel as it rotates. The vessel is further provided with a removable cover 9 and a valve 10 at its lower end.

The method herein disclosed is more particularly adapted to be used in the manufacture of perfumes or in the art of recovering odors from a retaining agent. Thus for instance, a retaining agent such as fat, holding odors is introduced into the presence of a recovering agent, such as alcohol, for which the odors have a greater affinity. The two agents are then thoroughly mingled or mixed and the fat broken up. This mixing may be done by any suitable means. It is preferably carried on in the same containing vessel, by inserting the vessel into a machine such as is described in a companion application filed October 8, 1906 Serial No. 337,845, in which the vessel is given a combined planetary and rotating motion. In that event the blades 13 are adjusted to stand radially of the vessel. The mass thus formed is then subjected to continued centrifugal separation until the particles of fat collected are solidified in a ring formation surrounding the alcohol which latter is left free in a liquid condition. During this action the odors have been transferred from the fat to the alcohol and are now available for use.

In the drawing 11 indicates the ring of fat formed adjacent to the circumference of the vessel while 12 indicates the liberated alcohol holding the odors.

What I claim is:

The method of transferring an odor from a material holding it to another material, which consists in mixing the material holding the odor with another material having a greater attraction for said odor and having a different specific gravity and a lower melting point, exposing both materials in a liquid form and in a substantially constant mass to centrifugal action and during said action, while the materials are being separated, cooling said mixed materials while in said constant mass to a temperature intermediate between the melting points of said materials until the first named material solidifies, leaving the odor attracting material in a liquid form.

Signed at New York city this 27 day of September 1906.

FREDERIC ECAUBERT.

Witnesses:
AXEL V. BEEKEN,
GEO. A. MARSHALL.